United States Patent [19]

Clayton

[11] 4,097,075

[45] Jun. 27, 1978

[54] TIRE VALVE CORE

[75] Inventor: Russell K. Clayton, Rougemont, N.C.

[73] Assignee: Eaton Corporation, Cleveland, Ohio

[21] Appl. No.: 800,767

[22] Filed: May 26, 1977

[51] Int. Cl.² ............................................. F16L 25/00
[52] U.S. Cl. .................................. 285/332.3; 285/356; 137/234.5; 277/172
[58] Field of Search ...................... 285/113, 247, 332.3, 285/356; 137/223, 234.5; 277/172

[56] References Cited

U.S. PATENT DOCUMENTS

| 2,815,228 | 12/1957 | Miller | 285/332.3 X |
| 2,932,531 | 4/1960 | Briechle | 137/234.5 X |
| 3,310,064 | 3/1967 | Voos | 137/234.5 |
| 3,967,639 | 7/1976 | Mottram | 137/234.5 |

*Primary Examiner*—Harold W. Weakley
*Attorney, Agent, or Firm*—F. M. Sajovec, Jr.

[57] ABSTRACT

A valve core having a barrel particularly adapted for use with a fluorocarbon gasket in which the area of the barrel under the gasket is defined by three annular surfaces of successively smaller diameter connected by beveled transition areas. The stepped configuration of the barrel in combination with a tapered valve stem seat provides areas of relatively high unit loading of the gasket against the stem seat bounded by areas of relatively low unit loading.

5 Claims, 3 Drawing Figures

TIRE VALVE CORE

This invention relates to the valves cores, and more specifically to a core having a drawn sheet metal barrel surrounded by a plastic sealing member.

Tire valve cores are well known in the art. They generally comprise a metal body surrounded by a rubber or plastic sealing element and contain valve means in the form of a pin disposed axially of the core and operable to unseat a plug at the bottom of the body. The entire valve core assembly is screwed into a valve stem attached to an inner tube or to a wheel rim.

A particularly suitable plastic material from which the sealing element may be produced is a fluorocarbon material such as polytetrafluoroethylene (PTFE) or perfluoroalkoxy (PFA) which will not stick or adhere to the valve seat within the stem when the core is removed. The fluorocarbon sealing member will also not adhere to the core barrels; therefore, it is necessary to provide some means to anchor the sealing member to the core.

U.S. Pat. No. 3,712,328 discloses a valve core in which ridges are formed in the barrel at the ends of the seal and grooves are formed adjacent the ridges to receive plastic flow of the seal to retain it on the barrel.

The low coefficient of friction and cold flow characteristics of PTFE and PFA make them very effective materials for use in seals of this type; however, these same characteristics also present certain problems.

Specifically, valve cores tend to loosen in their stems with age, particularly when subjected to heat. If the stems are overtorqued to try to prevent this condition the core barrel may crush, also causing core malfunction.

It is also desirable to provide a valve core which will also function well with a sealing element formed of rubber or of another form of plastic.

Accordingly, it is an object of this invention to provide a tire valve core, including a rubber or plastic sealing element, which will not tend to loosen in its stem.

Another object of the invention is to provide a tire valve core barrel which is particularly adapted for use with a fluorocarbon sealing element.

Another object of the invention is to provide a tire valve core having areas of relatively high unit loading between the seal and its seat and areas adjacent the areas of high unit loading which will accommodate cold flow of the seal material.

Another object of the invention is to provide a valve core in which the barrel will not tend to crush when subjected to excessive tightening torque.

To meet the above objectives the present invention provides a valve core barrel with three distinct diametral surfaces under the sealing element, the diametral surfaces being joined by beveled transition areas. The barrel structure provided is adapted to be used on machined barrels as well as on drawn sheet metal barrels. The three diameters get successively smaller from top to bottom of the sealing area of the barrel to generally follow the tapered contour of the valve stem seat; however, it can be appreciated that areas of relatively high unit loading of the seal against the seat are created in the areas where the clearance between the tapered seat and the straight barrel sides is relatively low.

Other objects and advantages of the invention will become more apparent from the following description when taken in connection with the accompanying drawings, wherein.

Figure 1:
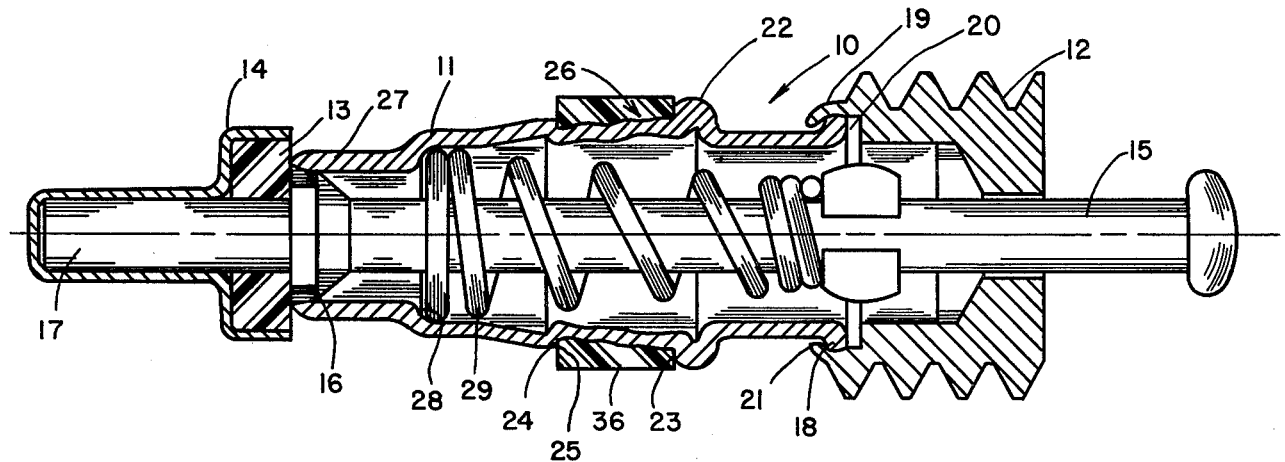
FIG. 1 is a longitudinal sectional view of a valve core constructed in accordance with the present invention.

As shown in the drawings, the novel valve core indicated generally at 10 comprises a barrel 11 and an externally threaded screw plug 12. Desirably, the screw plug is machined and the barrel is a drawn sheet metal shell.

The lower extremity of the barrel 11 engages a resilient washer 13 retained within a cup 14 as is conventional in this art. A valve center pin 15 extends through the barrel and screw plug and is maintained in axial alignment by reason of an enlarged annular shoulder 16, the cup 14 being mounted upon the extremity 17 of the valve pin.

The outer extremity of the barrel 11 terminates in an outwardly directed enlarged flange 18 and the screw plug 12 is provided at the lower extremity thereof with a relatively thin annular wall portion 19 providing an internal recess 20 having a diameter complementary to that of the enlarged flange 18 and within which this portion of the barrel 11 is received. To provide for secure assembly between the screw plug 12 and the barrel 11, the annular wall portion 19 is rolled or peened inwardly as indicated at 21.

The barrel 11 is provided with a rolled peripheral bead 22 terminating on one side thereof in a sharply defined shoulder 23 at the point of juncture with the outer surface of the barrel. Spaced from the shoulder 23, the barrel is provided with a slightly enlarged annular rib 24 having an inwardly tapered outer surface and providing a sharply defined shoulder 25 at the point of juncture with the barrel. The opposed shoulders 23 and 25 provide a gasket seat 26 located substantially centrally of the length of the barrel 11 and upon which the sealing gasket is retained.

The lower extremity 27 of the barrel is of reduced diameter providing an internal shoulder 28 upon which the valve spring 29, which surrounds the valve pin 15, seats in a conventional manner.

Figure 2:
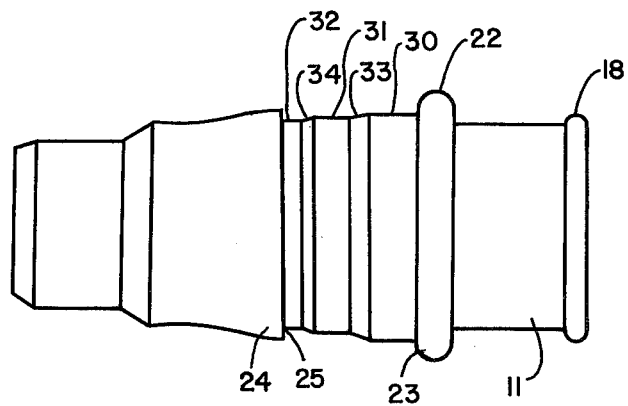
FIG. 2 is a side elevation view of a drawn metal valve core barrel constructed in accordance with the present invention.

Referring specifically to FIG. 2, the gasket seat 26 is defined by three distinct sealing surfaces 30, 31, 32, which are separated by beveled transition areas 33 and 34. Surface 30 has the largest diameter and takes up between one fourth and one third of the total barrel length between the shoulders 23 and 25. Intermediate surface 31 is of slightly smaller diameter than surface 30 and takes up between three quarters and one times the length taken up by surface 30. Surface 32 is of slightly smaller diameter than surface 31 and takes up between one third and two thirds of the length taken up by surface 30.

Transition area 33 connects surfaces 30 and 31 and is beveled at an angle consistent with the relative lengths and diameters of the surfaces 30 and 31. In the embodiment illustrated, the bevel is at an angle of about 12° to a line parallel to the surfaces 30, 31. Transition area 34 connects surfaces 31 and 32 and is also beveled at an angle consistent with the relative lengths and diameters of the surfaces it connects. The illustrated angle is also about 12°.

The sealing gasket 36 is a relatively short length of extruded rubber or plastic having an inside diameter which is slightly smaller than the diameter of the surface 32, to provide a snug fit over all three surfaces 30, 31, 32. The length of the gasket is substantially the same as the length between the shoulders 23 and 25.

Figure 3:
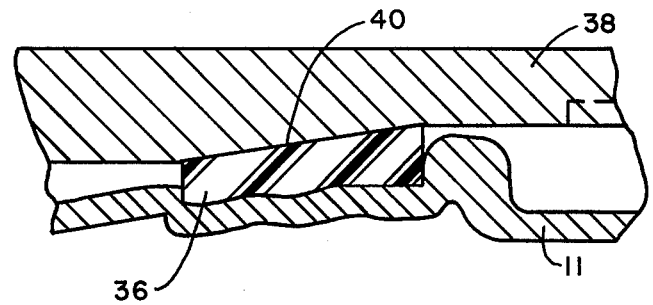
FIG. 3 is a fragmentary sectional view on an enlarged scale indicating the assembled relationship between the valve core and its cooperating valve seat within a valve stem.

FIG. 3 illustrates the assembled relationship between the valve core barrel 11 and the valve stem 38 into which the core is threaded. The interior of the valve stem 38 includes a tapered sealing area 40 which mates with the outside diameter of the gasket 36 to form an air tight seal.

Since the area 26 of the barrel 11 beneath the gasket 32 is stepped rather than uniformly tapered, it can be appreciated that areas of high unit loading between the gasket 36 and the mating tapered surface 40 are created at the intersections between surface 30 and transition area 33 and between surface 31 and transition area 34. These areas of high unit loading provide high sealability in these areas and insure that the valve core is properly centered within the stem to insure uniform sealing pressure about the circumference of the seal. The areas adjacent the areas of high unit loading are relatively lightly loaded and provide areas for the gasket material to flow into so that the barrel 11 will not tend to be crushed in the area between shoulders 23 and 25, even under the influence of excessive tightening torque applied to the valve core. The shoulders 23 and 25 restrain the gasket 36 and prevent it from being extruded out of the sealing area when the core is tightened into the stem.

In accordance with this invention, the stepped area of the core barrel under the gasket takes advantage of the characteristic of fluorocarbons such as PTFE and PFA to cold flow to conform to a surface to form a good seal and to prevent the barrel from being crushed under high tightening torque, while the areas of high unit loading created by the stepped configuration of the barrel relative to the tapered configuration of the stem bore insures that the gasket will not tend to loosen with age and when subjected to relatively high temperatures in use. It can be appreciated that the core barrel design of this invention will also perform well when used in conjunction with a gasket formed of rubber or of other types of plastic.

I claim:

1. In a tire valve core including a tubular barrel and an externally threaded head, the tubular barrel terminating at one extremity in an outwardly directed enlarged flange receivable within said head and said head being provided with a relatively thin annular wall portion terminating in an inwardly directed extremity to insure retention therein of the annular flange on said tubular barrel, a gasket receiving area formed on said tubular barrel substantially centrally of the length thereof, said gasket receiving area being bounded by substantially perpendicular wall portions formed on said barrel to define first and second shoulders spaced apart along the length of said barrel, and a gasket surrounding said barrel and received between said first and second shoulders; the improvement wherein said gasket receiving area of said barrel is defined by a first annular sealing surface, a second annular sealing surface of smaller diameter than the first sealing surface, a third annular sealing surface of smaller diameter than the second sealing surface, a first beveled transition area connecting said first and second sealing surfaces, and a second beveled transition area connecting said second and third sealing surfaces.

2. Apparatus as claimed in claim 1, in which said first sealing surface extends between one-fourth and one-third of the linear distance between said first and second shoulders, said second sealing surface extends for between three-quarters and one times the length of said first sealing surface, and said third sealing surface extends for between one-third and two-thirds of the length of said first sealing surface.

3. Apparatus as claimed in claim 1, in which said barrel is a drawn metal shell.

4. Apparatus as claimed in claim 1, in which said gasket is produced from fluorocarbon material.

5. In a tire valve assembly, a valve stem having a through bore with a tapered valve seat formed therein, a valve core including a tubular barrel and an externally threaded head attached to said barrel, a gasket receiving area formed on said tubular barrel substantially centrally of the length thereof, said gasket receiving area being bounded by substantially perpendicular wall portions formed on said barrel to define first and second shoulders spaced apart along the length of said barrel, a gasket surrounding said barrel and received between said first and second shoulders, and internal thread means formed in said valve stem to receive said externally threaded head, said gasket being placed in sealing engagement with said valve seat when said head is screwed into said stem; the improvement wherein the qasket receiving area of said barrel is defined by a first annular sealing surface at a first diameter, a second annular sealing surface at a second diameter smaller than the first diameter, and a third annular sealing surface at a third diameter smaller than the second diameter, said first and second sealing surfaces being connected by a first beveled transition area, and said second and third sealing surfaces being connected by a second beveled transition area.

* * * * *